United States Patent [19]

Kinneging et al.

[11] Patent Number: 4,632,812

[45] Date of Patent: Dec. 30, 1986

[54] PROCESS FOR MAKING ALKALI METAL PHOSPHATE SOLUTIONS CONTAINING LITTLE VANADIUM

[75] Inventors: Johannes-Wilhelmus Kinneging, Middelburg; Wouter Roos, Nisse; Bernardus J. Damman, Middelburg; Andries Jelsma, Goes, all of Netherlands; Raban von Schenck, Hofheim, Fed. Rep. of Germany

[73] Assignee: Hoechst Aktiengesellschaft, Fed. Rep. of Germany

[21] Appl. No.: 782,700

[22] Filed: Oct. 1, 1985

[30] Foreign Application Priority Data

Oct. 15, 1984 [DE] Fed. Rep. of Germany ....... 3437685

[51] Int. Cl.$^4$ ..................... C01B 25/16; C01B 15/16; C01B 25/26
[52] U.S. Cl. .................................. 423/309; 423/313; 423/321 R
[58] Field of Search ................... 423/321 R, 309, 313

[56] References Cited

U.S. PATENT DOCUMENTS

| | | | |
|---|---|---|---|
| 3,764,655 | 10/1973 | Ehlers et al. | 423/321 |
| 4,053,562 | 10/1977 | Harnisch et al. | 423/309 |
| 4,134,962 | 1/1979 | Ehlers et al. | 423/321 R |
| 4,490,336 | 12/1984 | Worthington et al. | 423/321 S |

*Primary Examiner*—John Doll
*Assistant Examiner*—Wayne A. Langel
*Attorney, Agent, or Firm*—Connolly and Hutz

[57] ABSTRACT

Alkali metal phosphate solutions containing little vanadium are made from phosphoric acid containing vanadium. To this end, a negative redox potential is established in the phosphoric acid by addition of a reductant, the acid is partially neutralized and an alkali metal-phosphorus-molar ratio between 0.85 and 1.0 is established, the partial neutralization being continued over a period of at least 10 minutes. The partially neutralized acid is not filtered intermediarily and the alkali metal/phosphorus-molar ratio is increased to 1.9 to 2.1 in a second neutralization stage, collected precipitate is separated and processed, if desired.

9 Claims, No Drawings

PROCESS FOR MAKING ALKALI METAL PHOSPHATE SOLUTIONS CONTAINING LITTLE VANADIUM

The present invention relates to a process for making alkali metal phosphate solutions containing little vanadium from phosphoric acid containing vanadium, the alkali metal phosphate solutions presenting an alkali metal/phosphorus-molar ratio of at least 1.9:1. To this end, the vanadium contained in the phosphoric acid is reduced with the aid of a reductant and the acid is neutralized in two stages in the presence of iron(II)-ions with an alkali metal hydroxide and/or carbonate over as long a period as necessary to establish the alkali metal/-phosphorus-molar ratio targeted for the final product, and precipitated solid matter is separated from the alkali metal phosphate solution obtained.

If desired, it is possible for the separated precipitate to be processed by reacting it with an alkali and for the resulting alkali metal phosphate solution to be filtered off from undissolved residue, for the latter to be discarded and for the filtrate to be recycled into the process.

A process of this kind has been described in German Specification DE-A 2 608 029, (corresponding essentially to Ehlers et al, U.S. Pat. No. 4,134,952, issued Jan. 16, 1979) for example, wherein the phosphoric acid is initially pretreated with sodium hydroxymethane sulfinate as a reductant and then neutralized in a first neutralization stage until establishment of an alkali metal oxide/$P_2O_5$-molar ratio of 1.0:1.8:1. Precipitated matter must then be separated. Next, the solution obtained is admixed with an iron(II)salt and neutralized until establishment of an alkali metal oxide/$P_2O_5$-molar ratio larger than 1.9:1. Matter precipitated during this treatment step must also be separated by filtration.

Adverse effects of this prior process reside in the following: it is invariably necessary for matter precipitated between the two neutralization stages to be filtered; the bulk of the vanadium contained in the precipitated matter originating from two filtrations becomes redissolved on subjecting the precipitated matter to treatment with an alkali for recovery of the $P_2O_5$ contained therein; as a result, vanadium must be separated once again from the feed solution, again by addition of iron(II)salt; in addition $P_2O_5$ which is converted to iron phosphate is lost.

We have now unexpectedly found that these disadvantages can be obviated by our present process which provides for a negative redox potential of less than $-150$ mV to be established in the phosphoric acid containing vanadium by addition of a reductant and for the acid to be partially neutralized until establishment of an alkali metal/phosphorus-molar ratio between 0.85 and 1.0, preferably between 0.94 and 0.98 and establishment of a redox potential smaller than $-250$ mV. This partial neutralization until establishment of a molar ratio smaller than 1 is continued over a period of at least 10 minutes, preferably of more than 30 minutes, and, without subjecting the partially neutralized material to intermediary filtration, the alkali metal/phosphorus-molar ratio is increased to 1.9 to 2.1, collected precipitate is separated and, if desired, reacted with an alkali to minimize loss of $P_2O_5$.

Useful reductants are iron turnings or borings, ferrosalts, sulfides, sulfites or hydroxymethanesulfinates, and especially ferrosilicon and ferrophosphorus. Especially ferrophosphorus permits the necessary low redox potentials to be readily established, and it continues to be an active reductant even in the neutral or alkaline range. The ferrosilicon and ferrophosphorus should conveniently be used in the form of particles having a size of less than 100 μm, preferably less than 20 μm.

The ferrosilicon and ferrophosphorus can also be used in admixture with iron turnings or borings. This should more preferably be done in all those cases in which the phosphoric acid contains a proportion of iron insufficient for quantitative precipitation of vanadium in form of an iron-vanadylphosphate complex. The solution should conveniently contain more than 0.25 weight % iron(II).

It is good practice to collect the precipitate separated after the second neutralisation stage and process it. To this end, the precipitate consisting substantially of metal phosphates should be subjected at increased temperature to reaction with an alkali in a molar ratio of alkali metal/phosphorus larger than 3.1, during which the bulk of the phosphates become dissolved, the residue consisting substantially of the iron-vanadyl-phosphate-complex. Next, the whole is filtered off from undissolved matter and the filtrate is directly recycled into the first neutralization stage.

Unlike vanadium contained in the precipitated matter obtained after the first and second neutralization stages in standard processes, the vanadium contained in the precipitate obtained in accordance with this invention could not be found to become redissolved. This is a highly unexpected result making it possible for the filtrate obtained during processing to be directly recycled into the first neutralization stage; in the prior art processes, the vanadium is required to be precipitated and filtered once again.

A further advantageous feature of the present invention provides for the entire reaction to be effected under inert gas, preferably under nitrogen.

The following Examples illustrate the invention which is naturally not limited thereto:

The feed material used in the Examples was so-called "green acid" obtained by subjecting phosphate ore to wet processing treatment with sulfuric acid. After addition of the reductant, a negative redox potential was found to have established which decreased considerably after the first neutralization stage. At the same time, the vanadium-content of the solution was found to have been reduced and a precipitate was found to have been formed. The mixture obtained was stirred over a period of at least 30 minutes and subjected to the second neutralization without being filtered intermediarily.

After the second neutralization stage, the vanadium content of the solution was found to have been further decreased and the filter cake was introduced into washed filtrate containing 5–7 wgt % $P_2O_5$ and presenting a sodium/phosphorus-molar ratio of about 4. The mixture was admixed with an alkaline liquor, stirred for about 1 hour at 95° C. and filtered.

As a result of its low vanadium content, it was possible for the filtrate presenting a Na/P-molar ratio larger than 3:1 to be directly recycled, i.e. without subjecting it to intermediary treatment, into the first neutralization stage, for dilution and neutralization.

EXAMPLE 1

Reductant: 0.2 wgt % Fe-turnings and 0.02 wgt % ferrophosphorus 10 μm

| | wgt % P₂O₅ | wgt % Fe | redox-potential mV | wgt % V | Na/P-molar ratio | wgt % Na |
|---|---|---|---|---|---|---|
| Green acid | 46.1 | 0.23 | +430 | 0.058 | | |
| After reduction | 46.1 | 0.45 | −150 | 0.058 | | |
| After 1st neutralization | 24.5 | — | −310 | 0.0078 | 1.03 | |
| After 2nd neutralization | 18.6 | — | — | 0.0002 | 2.09 | |
| Filtrate processed | 6.7 | — | — | 0.0001 | 4.2 | |
| Filter cake processed | 11.8 | 11.1 | — | 1.49 | | 4.6 |
| Yield P₂O₅ 98.9 wgt % | | | | | | |
| Yield Na 99.3 wgt % | | | | | | |

EXAMPLE 2

Reductant: 0.2 wgt % Fe-turnings and 0.2 wgt % ferrophosphorus 10 μm

| | | | | | |
|---|---|---|---|---|---|
| Green acid | 46.1 | 0.23 | +430 | | |
| After reduction | 45.0 | 0.41 | −120 | 0.0541 | 0.12 |
| After 1st neutralization | 23.6 | 0.32 | −220 | 0.0088 | 0.99 |
| After 2nd neutralization | 17.8 | | | 0.0005 | 2.06 |
| Filtrate processed | 6.8 | | | <0.0001 | 3.37 |
| Filter cake processed | 14.45 | 12.0 | | 1.29 | 2.49 |
| Yield P₂O₅ 98.7 wgt % | | | | | |
| Yield Na 99.7 wgt % | | | | | |

| | | | | | | |
|---|---|---|---|---|---|---|
| Green acid | 50.0 | | +420 | 0.0398 | 0.01 | |
| After reduction | 49.7 | 0.39 | −125 | 0.0376 | | |
| After 1st neutralization | 22.8 | 0.15 | −320 | 0.0065 | 1.025 | |
| After 2nd neutralization | 18.3 | | | 0.0001 | 2.04 | |
| Filtrate processed | 6.7 | | | <0.0001 | 3.27 | |
| Filter cake processed | 15.5 | 15.1 | | 1.19 | | 3.06 |
| Yield P₂O₅ 99.0 wgt % | | | | | | |
| Yield Na 99.7 wgt % | | | | | | |

EXAMPLE 3

Reductant: 0.2 wgt % Fe-turnings and 0.4 wgt % ferrophosphorus 10 μm

| | wgt % P₂O₅ | wgt % Fe | redox-potential mV | wgt % V | Na/P-molar ratio | wgt % Na |
|---|---|---|---|---|---|---|
| Green acid | 50.0 | | +420 | 0.0398 | 0.01 | |
| After reduction | 49.7 | 0.39 | −124 | 0.0393 | | |
| After 1st neutralization | 24.0 | 0.17 | −340 | 0.0115 | 0.945 | |
| After 2nd neutralization | 20.6 | | | 0.0001 | 2.05 | |
| Filtrate processed | 5.5 | | | <0.0001 | 3.34 | |
| Filter cake processed | 16.95 | 13.8 | | 1.08 | | 6.53 |
| Yield P₂O₅ 98.8 wgt % | | | | | | |
| Yield Na 99.3 wgt % | | | | | | |

EXAMPLE 4

Reductant: 0.2 wgt % Fe-turnings and 0.4 wgt % ferrophosphorus 10 μm

EXAMPLE 5

Reductant: 0.2 wgt % Fe-turnings and 0.2 wgt % ferrophosphophorus 10 μm

| | wgt % P₂O₅ | wgt % Fe | redox potential mV | wgt % V | Na/P-molar ratio | wgt % Na |
|---|---|---|---|---|---|---|
| Green acid | 50.0 | | | | | |
| After reduction | 47.3 | 0.54 | −70 | 0.0652 | | |
| After 1st neutralization | 23.8 | 0.22 | −200 | 0.0112 | 0.945 | |
| After 2nd neutralization | 17.7 | | | 0.0008 | 2.03 | |
| Filtrate processed | 6.5 | | | 0.0031 | 3.28 | |
| Filter cake processed | 10.23 | 12.7 | | 1.32 | | 3.36 |

EXAMPLE 6

Reductant: 0.7 wgt % ferrophosphorus 10 μm

| | | | | | |
|---|---|---|---|---|---|
| Green acid | 46.8 | 0.28 | +460 mV | 0.0640 | |
| After reduction | 45.5 | 0.42 | −180 mV | 0.0610 | |
| After 1st neutralization | 23.0 | 0.24 | −356 mV | 0.0120 | 0.961 |

-continued

| | Wgt % P$_2$O$_5$ | Wgt % Fe | Wgt % V | Na/P-molar ratio |
|---|---|---|---|---|
| After 2nd neutralization | 17.8 | | 0.0002 | 2.04 |
| Filtrate processed | 3.28 | | 0.0003 | 3.28 |
| Filter cake processed | 19.3 | 16.4 | 1.40 | 1.47 |
| Yield P$_2$O$_5$ 98.6 wgt % | | | | |
| Yield Na 99.7 wgt % | | | | |

EXAMPLE 7

(Comparative Example)

| | Wgt % P$_2$O$_5$ | Wgt % Fe | Wgt % V | Na/P-molar ratio |
|---|---|---|---|---|
| Green acid | 48.7 | 0.24 | 0.0350 | |
| After metered addition of iron(II)sulfate solution as a reductant, and dilution | 26.2 | 0.25 | 0.0187 | 0.55 |
| After 1st neutralization and filtration | 21.2 | — | 0.0008 | 1.23 |
| After 2nd neutralization and filtration | 18.2 | — | 0.0006 | 1.96 |
| Filtrate processed | 9.4 | — | 0.0320 | ~2.9 |
| Filter cake processed | 28–30 | | 0.06 | |
| Processed filtrate after having been neutralized with green acid to pH 6 and 2nd metered addition of iron and filtration | 11.5 | 0.0182 | 0.0030 | 1.56 |
| Filter cake of vanadium removed from processed filtrate | 40 | | 0.45 | |
| Yield P$_2$O$_5$ 90–92 wgt % | | | | |

We claim:

1. In the process for making alkali metal phosphate solutions having low contents of vanadium from phosphoric acids containing vanadium values by reducing the vanadium contained in the acids with the aid of reductants, precipitating the reduced vanadium in the presence of ferrous ions by subjecting the phosphoric acids to neutralization in two stages with an alkali metal hydroxide and/or carbonate and separating the resulting precipitate from the alkali metal phsophate solutions obtained the improvement, which comprises: adding to the phosphoric acids reductants which establish therein a negative redox potential, neutralizing the acids in the first neutralization stage to an alkali metal/phosphorous-molar ratio between 0.85 and 1.0 maintaining this molar ratio over a period of at least 10 minutes without separating the precipitates formed, thereafter increasing the alkali metal/phosphorus-molar ratio to 1.9 to 2.1 in the second neutralization stage and separating jointly the precipitates yielded in the two neutralization stages from the alkali metal phosphate solutions obtained.

2. The process as claimed in claim 1, wherein a redox potential smaller than −150 mV is established in the acids.

3. The process as claimed in claim 1, wherein the phosphoric acids are neutralized in the first neutralization stage to an alkali metal/phosphorus-molar ratio of 0.94 to 0.98.

4. The process as claimed in claim 1, wherein the alkali metal/phosphorus-molar ratio established in the first neutralization stage is maintained over a period of more than 30 minutes.

5. The process as claimed in claim 1, wherein ferrosilicon, iron turnings or borings, ferrosulfate, a sulfide, a sulfite or a hydroxy methanesulfinate are used as reductants.

6. The process as claimed in claim 1, wherein ferrophosphorus is used as reductant.

7. The process as claimed in claim 1, wherein the ferrophosphorus is used in form of particles having a size of less than 100 μm.

8. The process as claimed in claim 1, wherein the reaction is effected under inert gas.

9. A process for making alkali metal phosphate solutions having low contents of vanadium from phosphoric acids containing vanadium values by reducing the vanadium contained in the acids with the aid of reductants precipitating the reduced vanadium in the presence of ferrous ions by subjecting the phosphoric acids to neutralization in two stages with an alkali metal hydroxide and/or carbonate and separating the resulting precipitate from the alkali metal phosphate solutions obtained, which comprises: adding to the phosphoric acids reductants which establish therein a negative redox potential, neutralizing the acids in the first neutralization stage of an alkali metal/phosphorus-molar ratio between 0.85 and 1.0, maintaining this molar ratio over a period of at least 10 minutes without separating the precipitates formed, thereafter increasing the alkali metal/phosphorus-molar ratio to 1.9 to 2.1 in the second neutralization stage, separating jointly the precipitates yielded in the two neutralization stages from the alkali metal phosphate solutions obtained, processing the separated precipitates with an alkali at an alkali metal/phosphorus-molar ratio larger than 3:1, filtering off undissolved matter and recycling directly the filtrate obtained into the first neutralization stage.

* * * * *